Aug. 14, 1928.
H. PARKER
1,681,145
METHOD OF AND APPARATUS FOR HANDLING AND DRYING PULP TUBES OR THE LIKE
Filed March 3, 1923   12 Sheets-Sheet 1
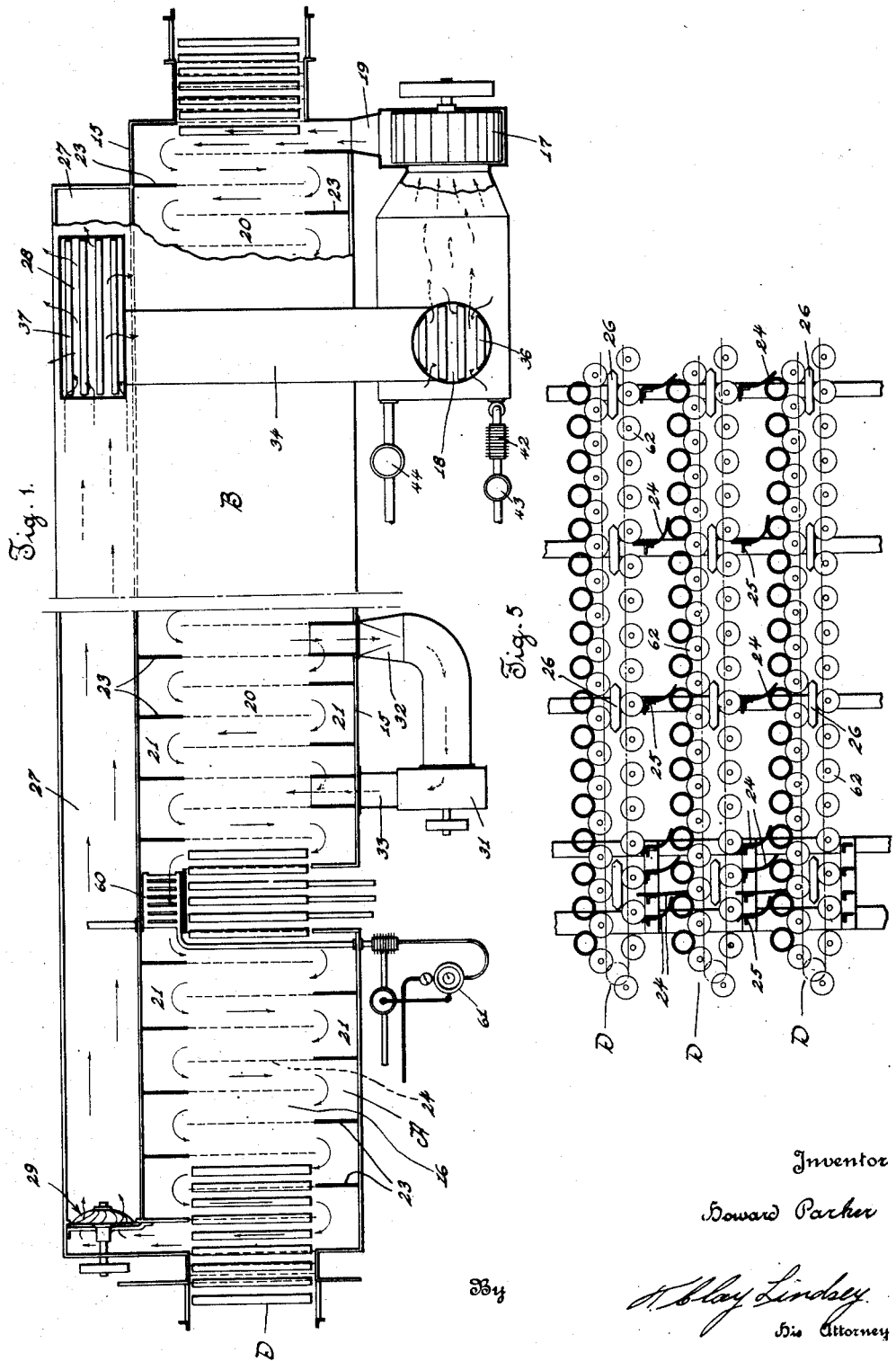
Inventor
Howard Parker
By
H. Clay Lindsey
His Attorney Aug. 14, 1928.  H. PARKER  1,681,145
METHOD OF AND APPARATUS FOR HANDLING AND DRYING PULP TUBES OR THE LIKE
Filed March 3, 1923   12 Sheets-Sheet 2
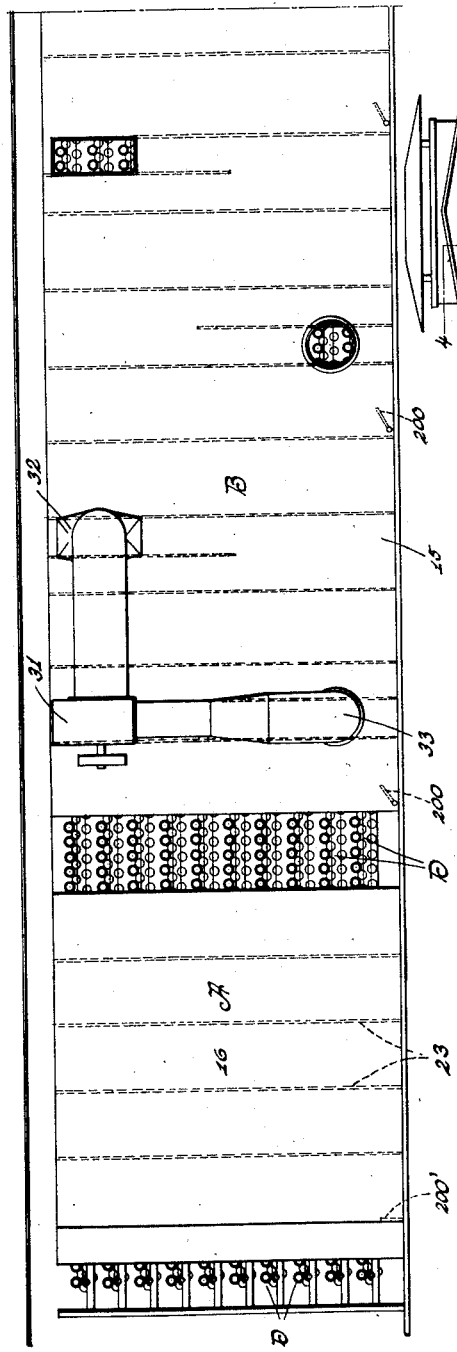
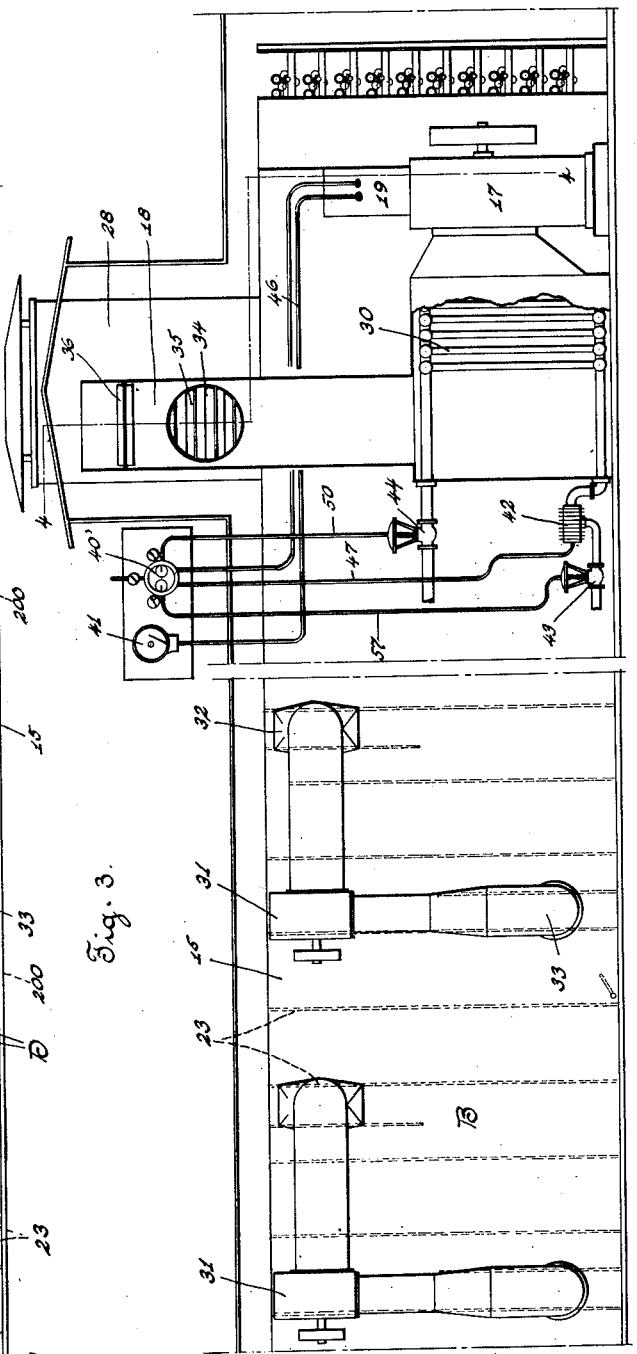
Inventor
Howard Parker
By T. Clay Lindsey
His Attorney Aug. 14, 1928.

H. PARKER 1,681,145

METHOD OF AND APPARATUS FOR HANDLING AND DRYING PULP TUBES OR THE LIKE

Filed March 3, 1923    12 Sheets-Sheet 3

Inventor
Howard Parker
By
His Attorney

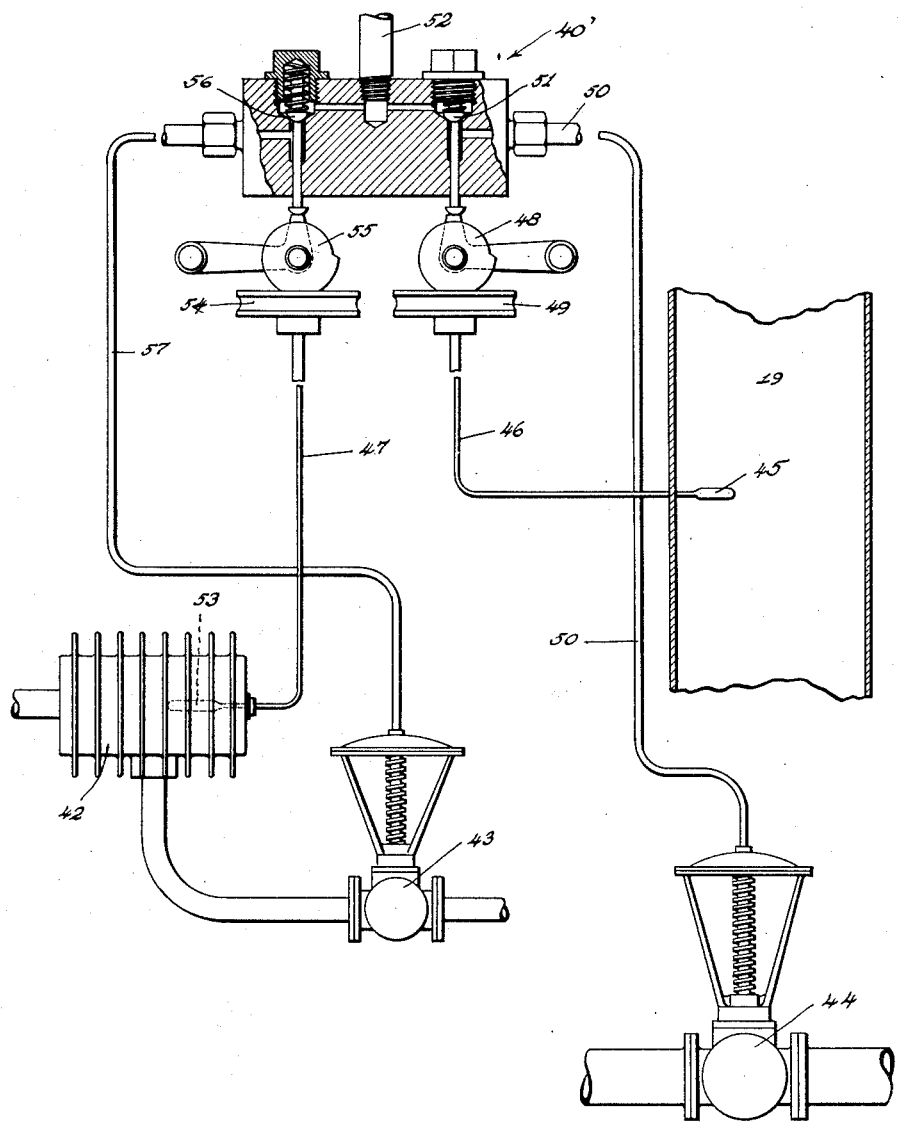

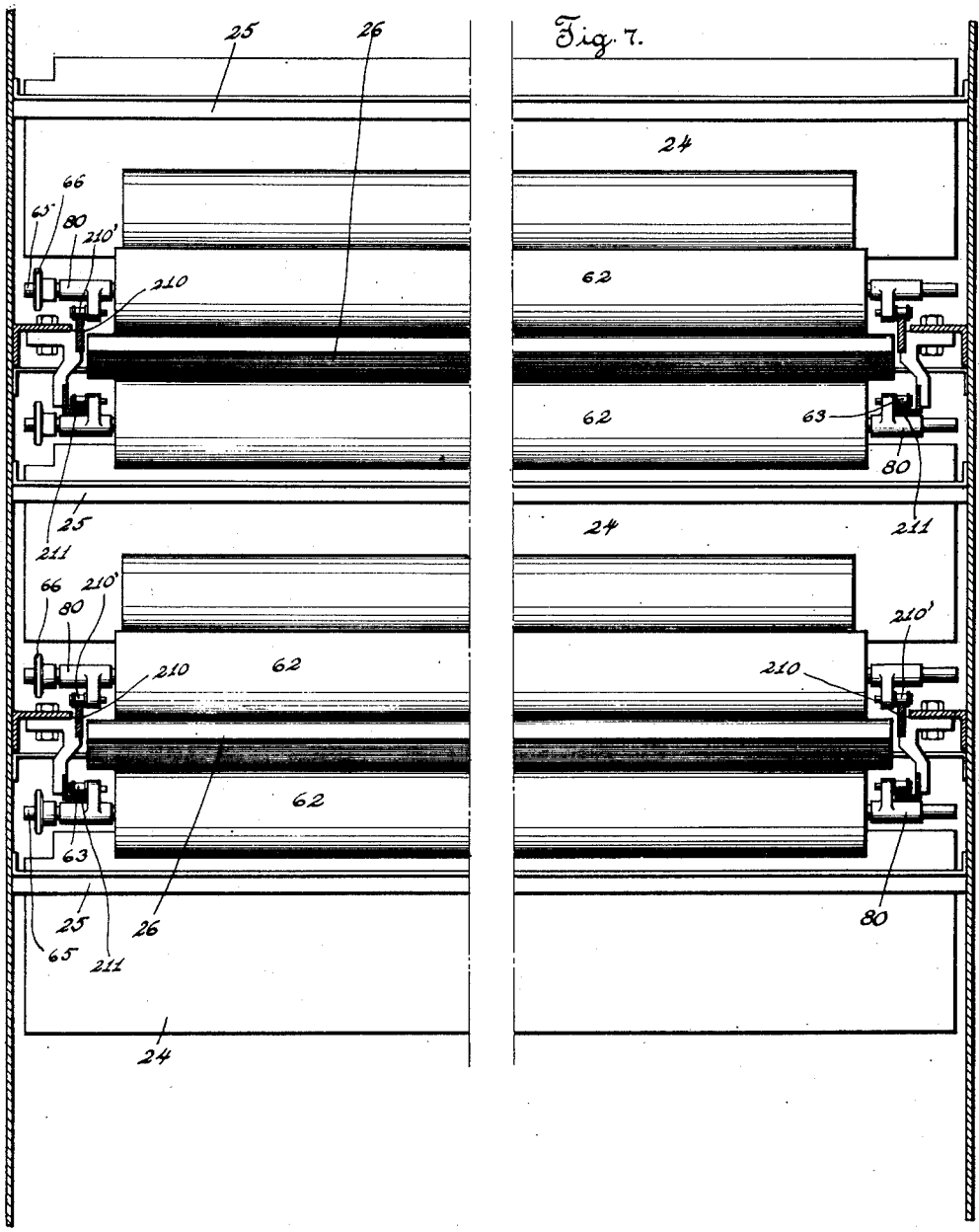

Aug. 14, 1928.  
H. PARKER  
1,681,145  
METHOD OF AND APPARATUS FOR HANDLING AND DRYING PULP TUBES OR THE LIKE  
Filed March 3, 1923  12 Sheets-Sheet 6

Inventor  
Howard Parker  
His Attorney

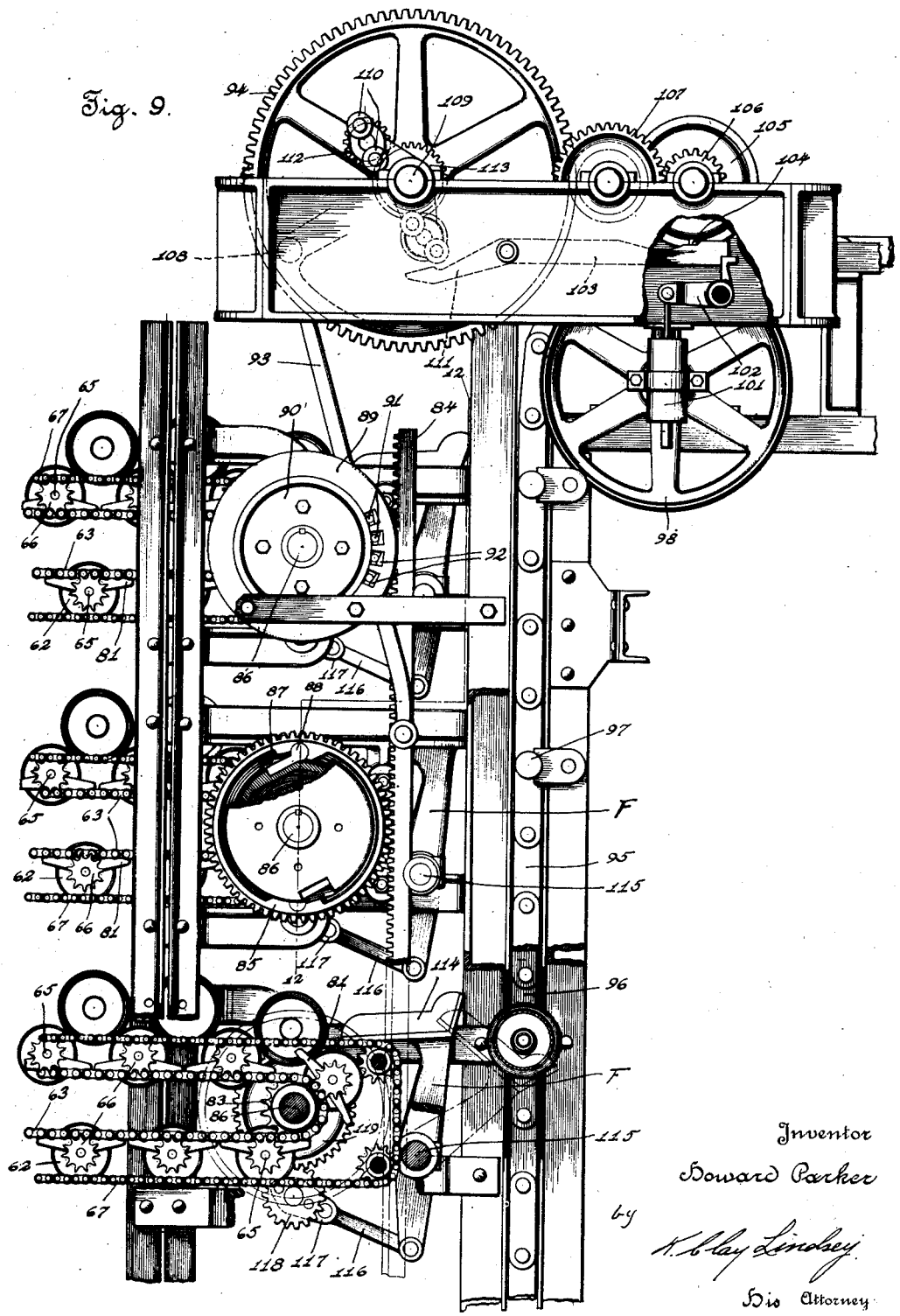

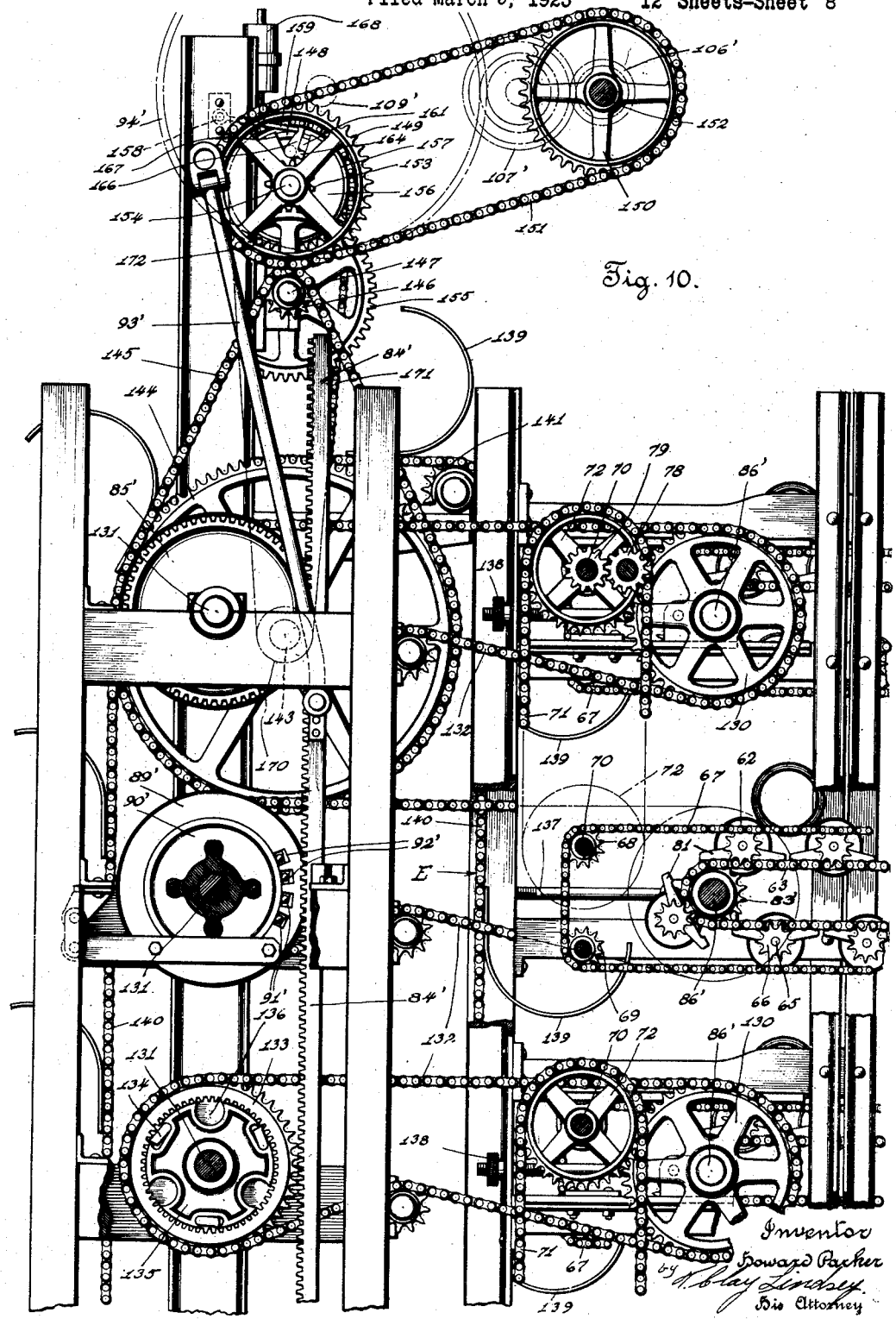

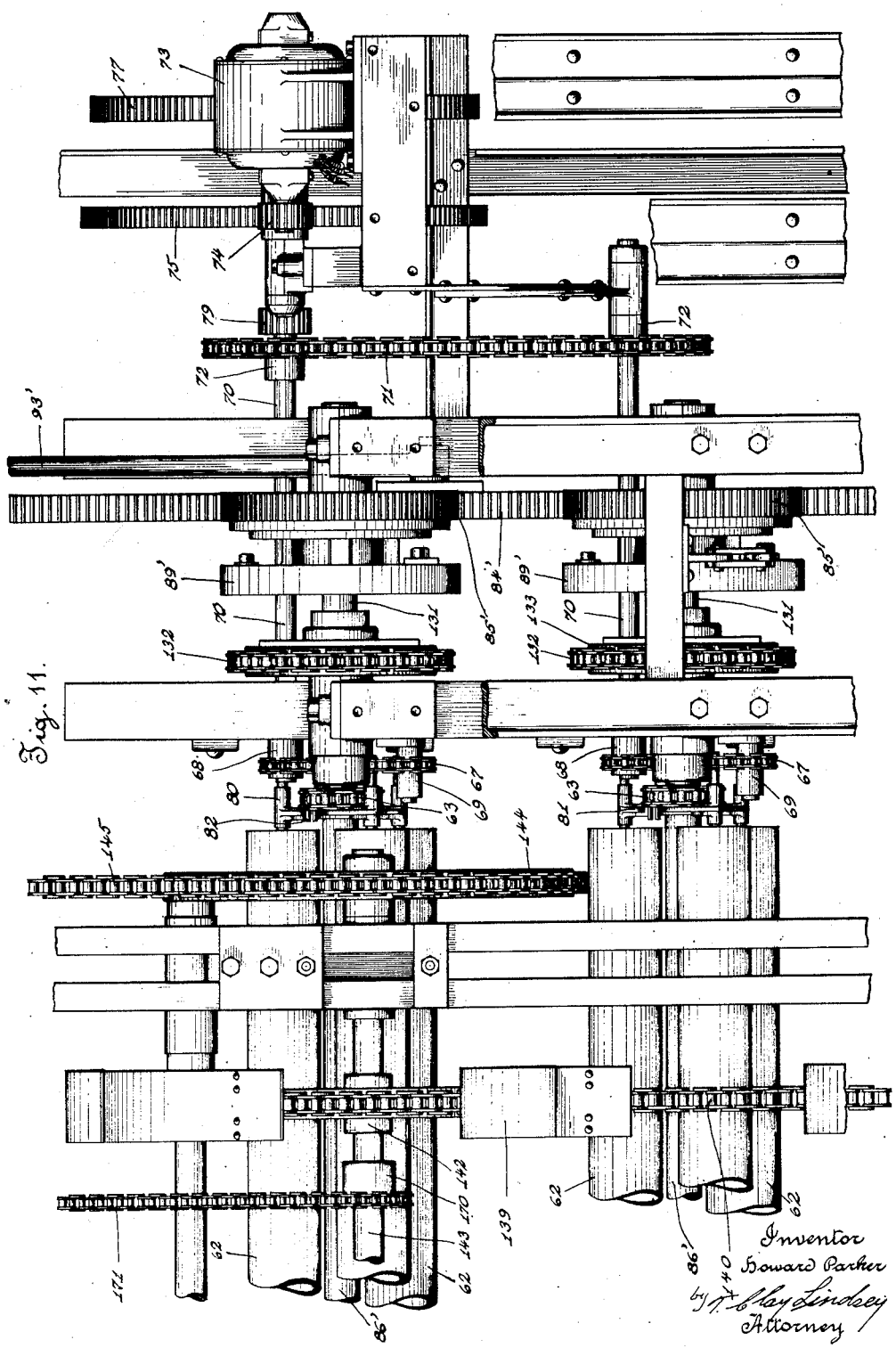

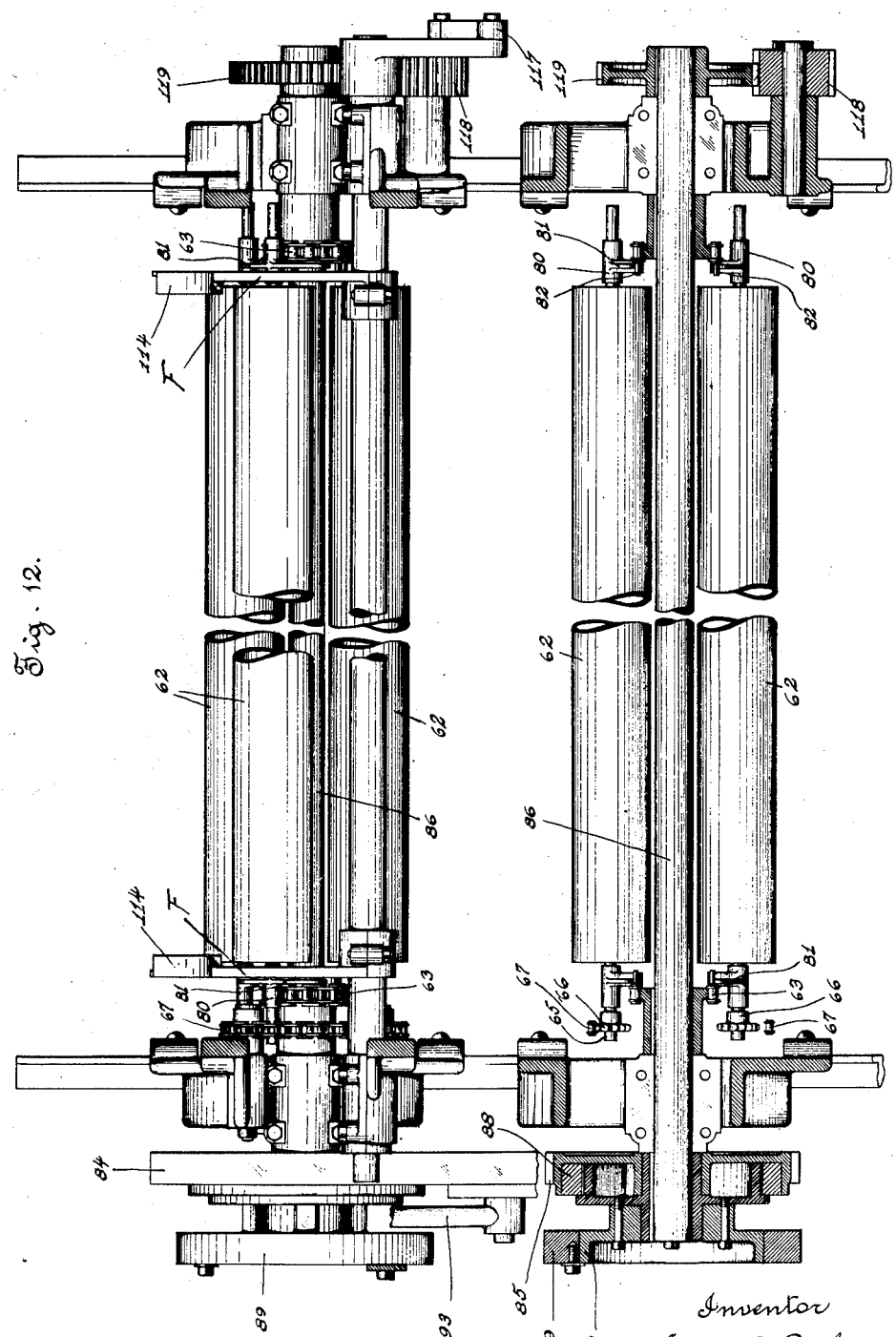

Aug. 14, 1928.
H. PARKER
1,681,145
METHOD OF AND APPARATUS FOR HANDLING AND DRYING PULP TUBES OR THE LIKE
Filed March 3, 1923    12 Sheets-Sheet 11
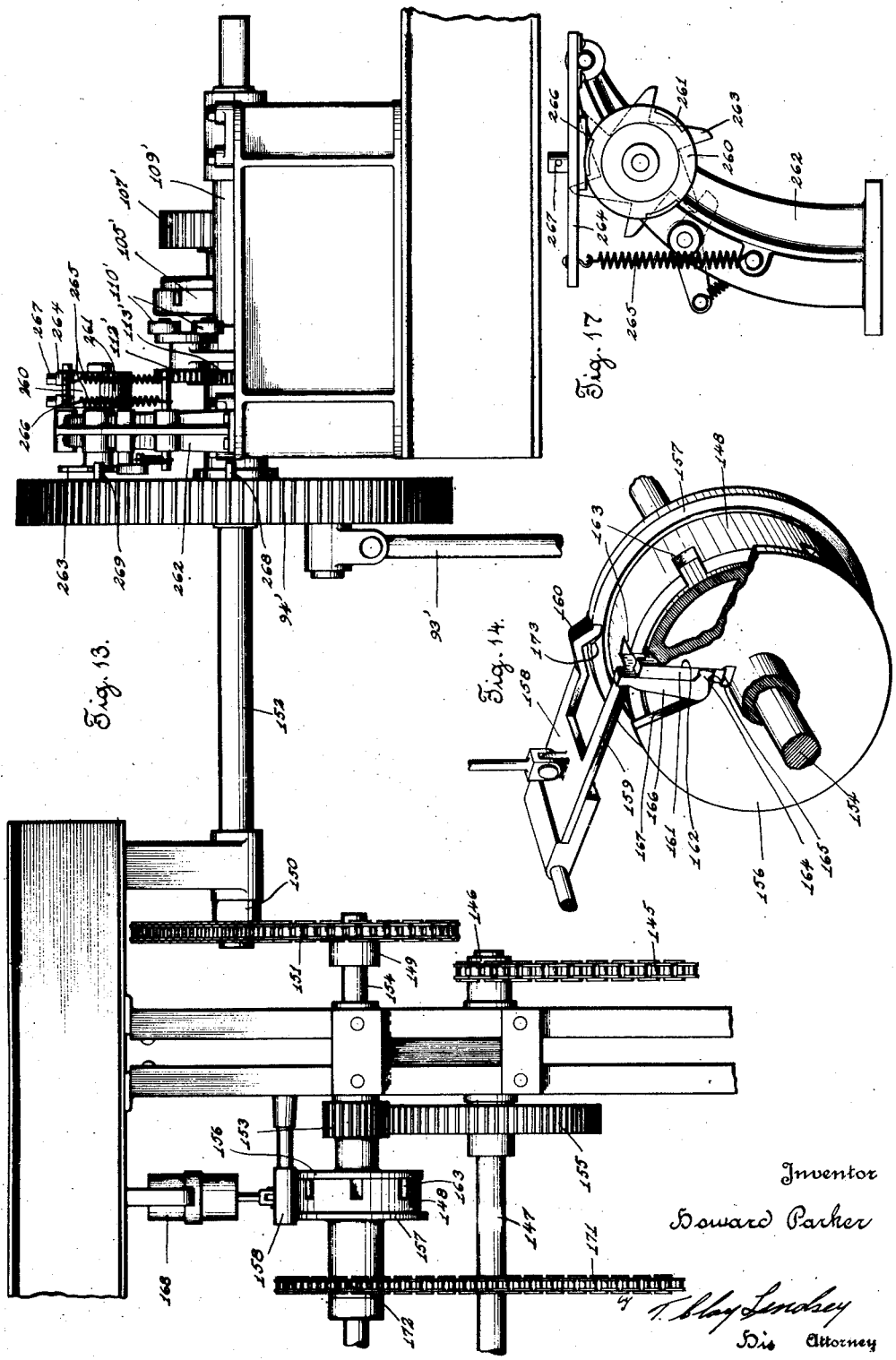
Inventor
Howard Parker

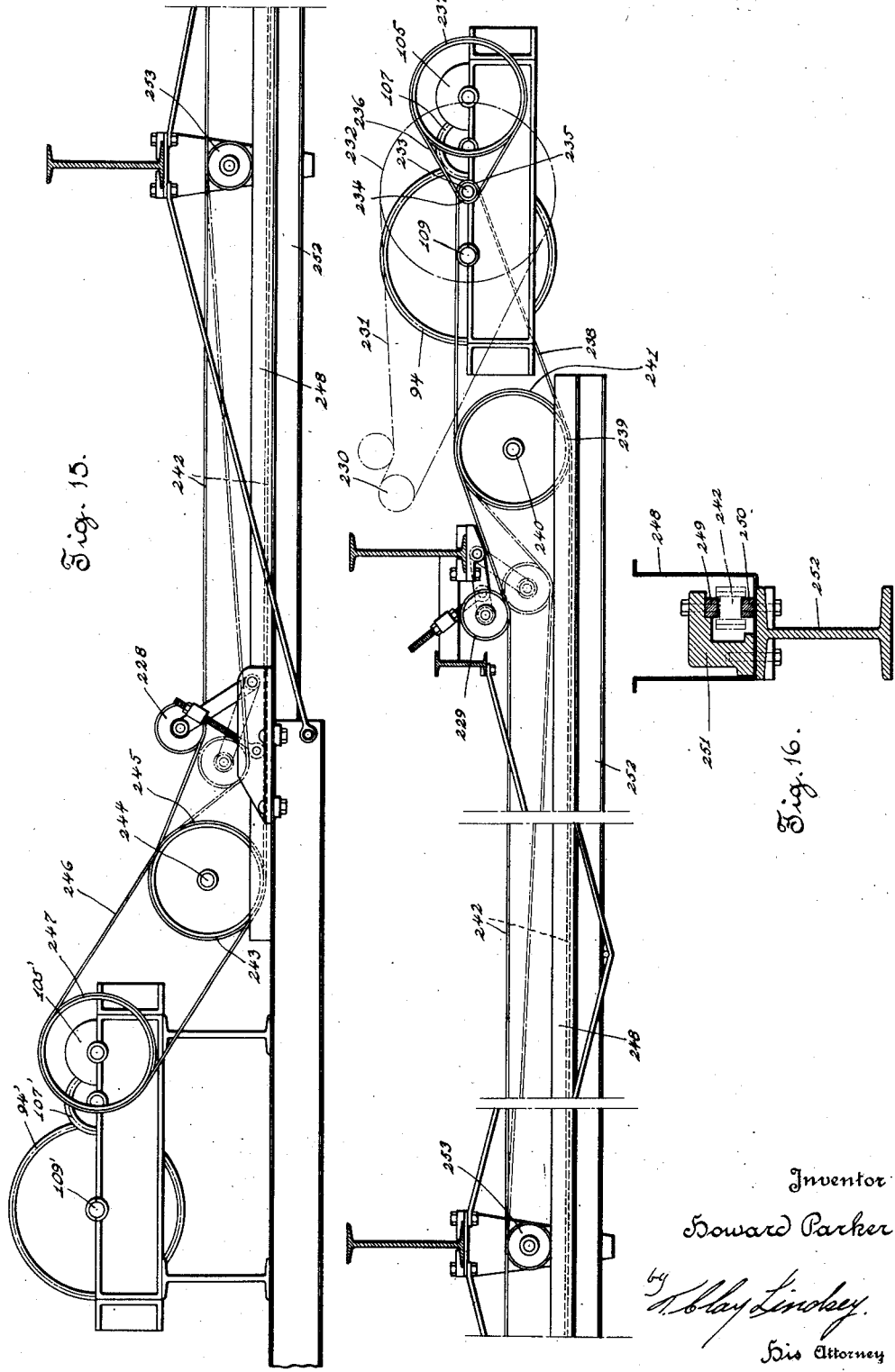

Patented Aug. 14, 1928.

1,681,145

UNITED STATES PATENT OFFICE.

HOWARD PARKER, OF BERLIN, NEW HAMPSHIRE, ASSIGNOR TO BROWN COMPANY, OF PORTLAND, MAINE, A CORPORATION OF MAINE.

METHOD OF AND APPARATUS FOR HANDLING AND DRYING PULP TUBES OR THE LIKE.

Application filed March 3, 1923. Serial No. 622,610.

This invention relates to methods and apparatus for drying articles, and, more particularly, to methods and apparatus for drying hollow articles, such as tubes and the like formed of pulp.

One of the objects of the invention is to provide an improved method of drying, wherein the articles to be dried are gradually but completely dried at a rate which eliminates warping and other malformation of the articles.

Another object is to provide an efficient apparatus for handling the drying articles and by which they are automatically fed to the drier and discharged therefrom.

Another object of the invention is to provide an improved form and arrangement of parts for a drier and apparatus for conveying material therethrough which is efficient, automatically operative, and reliable.

A further object of the invention is to provide an improved form of drying apparatus in which the drying medium acts with varying effect on the articles at various stages of drying and with a maximum of efficiency and economy as to the heat employed.

Another object is to provide an improved form of apparatus cooperative with the drying apparatus by means of which the articles to be dried are prepared for the operation of the drier.

Other objects will be, in part, obvious and, in part, pointed out hereinafter.

The embodiment of the invention hereinafter described is particularly adapted for use in the manufacture of tubes made from wood pulp by the method and apparatus more fully described in my co-pending application, Serial No. 450,370, filed March 7, 1921, and wherein are included a method and apparatus for forming such tubes on mandrels, and means for conveying tubes so formed to a drier while in a wet state. The apparatus hereinafter described more particularly may form an integral part of an entirely automatic machine for the complete forming, drying, and delivery of tubes of this character.

In the drawings forming a part of this specification and in which the similar reference characters refer to similar parts, Figure 1 is a plan view, partly diagrammatic, showing the arrangement of parts of the drying apparatus;

Figs. 2 and 3 when placed end to end form a complete side elevation of the drying apparatus, showing the means for heating the drying air and the controls for such heating apparatus;

Fig. 5 is a diagrammatic view showing interior portions of the drying chamber, including the tube carriers;

Fig. 6 is a view of the means for regulating the heating of the air current employed in drying the articles within the drying chamber;

Fig. 7 is a detail view in transverse vertical section of a portion of the carriers for passing the tubes through the drier;

Fig. 9 is a detail view showing the receiving end of the carriers and the construction of the means employed for charging the carriers;

Fig. 10 is a detail view of a portion of the discharging end of the drier mechanism;

Fig. 11 is a rear end view of a portion of the drier mechanism;

Fig. 12 is a detail view of the forward ends of two of the tube carriers, the view being taken substantially on lines 12—12 of Fig. 9;

Fig. 13 is a detail view in rear elevation of the drive means for the conveyor adapted to receive the tubes from the drier carriers;

Fig. 14 is a view of a clutch controlling mechanism associated with the mechanism shown in Fig. 13;

Fig. 15 is a view partly diagrammatic showing the manner of associating the drive mechanisms at opposite ends of the drier carriers;

Fig. 16 is a detail in transverse cross-section of the supporting structure for the chain connecting the drive mechanisms; and Fig. 17 is a side elevation of a switch controlling the receiving conveyor at the discharge end of the drier.

Figure 4:
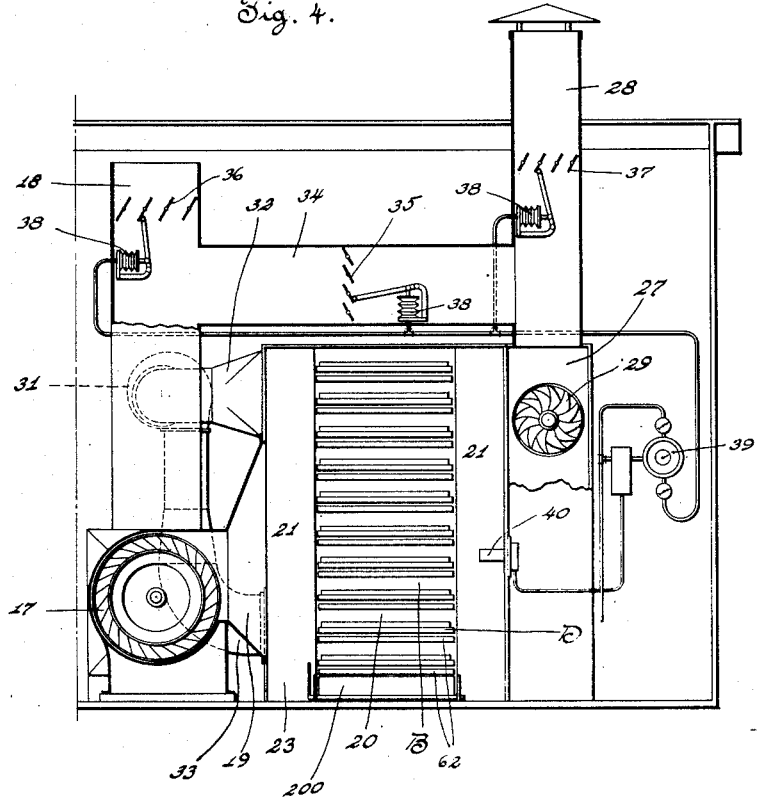
Fig. 4 is an end view of the drying apparatus including the means adapted to regulate the humidity of the air entering the drying chamber, parts being broken away on substantially the line 4—4 of Fig. 3.

In the application above referred to there is described a process and apparatus which may be used in connection with the method and apparatus hereinafter described. It is understood, however, that said application is referred to by way of illustration only, it being obvious that the process and various features of mechanical construction hereinafter described may be used in other combinations than that recited in said application. As described in that application, the tubes are formed in the tube-forming machine by winding a wet web of pulp onto a mandrel under pressure until a tube wall of predetermined thickness is built up. The tubes are automatically delivered from the tube-forming machine, one by one, to a transfer conveyor where they are engaged by mandrel holding devices, and each time a new tube is engaged with the transfer conveyor it is stepped ahead one step. At the discharge side of the conveyor there is a drier provided with a plurality of stages, positioned one above the other, and each stage has a horizontally disposed carrier in the form of rollers carried by suitable chains. After a predetermined number of tubes have been delivered to the transfer conveyor so that there is a tube in front of each stage, the mandrel holding devices are withdrawn and suitable mechanism is actuated for delivering the tubes simultaneously, one to each drier carrier. These carriers are intermittently actuated, being stepped forward automatically each time a tube is delivered thereto, and the rollers on which the tubes are supported are continuously rotated to keep the tubes in proper shape. At the discharge end of the drier mechanism is a receiving conveyor which receives tubes simultaneously one from each carrier, and conveys them down to a suitable point.

The present application relates more particularly to the mechanical mechanisms of the drier and the circulation and control of the drying medium and the process or processes resulting from these features.

For the purpose of describing the apparatus more clearly, a brief outline of the functions and coordination of its various parts will first be given, followed by a description in detail of these parts and their method of operation.

There is provided a chamber (Figs. 1, 2, and 3,) subdivided into two sections, one being a "sweating" chamber A, into which the articles to be dried are first introduced to loosen them from their mandrels; and the other a drying chamber B, into which the articles pass from the "sweating" chamber. The articles are brought to the chamber A by a transfer conveyor C which arranges them before the front or charging end of the drier at a plurality of levels or stages, there being ten provided in this embodiment. At each such stage there is a carrier D (Fig. 5) for conveying the articles the length of the "sweating" chamber A and the drying chamber B, thereafter discharging them into a receiving conveyor E by which they are carried to a suitable discharge point. For the purpose of transferring the articles to the drier, a pair of shifting arms F is positioned at each stage between the conveyor C and the carrier D, which arms operate automatically to take tubes from the former and place them on the latter. Following the course which the tubes take, the tubes are brought by the transfer conveyor C from the forming apparatus (not shown) and advanced step by step until there are ten of them in position before the carriers D. As the tenth tube moves into place they are automatically released from the conveyor C and placed on the shifting arms F which have moved into position to receive them and which now move forward to shift them onto the carriers D. The carriers D move forward, step by step, until the tubes have passed through the "sweating" chamber A and the drying chamber B, whereupon they are discharged dry into the receiving conveyor E which starts automatically and carries them to a suitable discharge point.

Referring more particularly to Figs. 1 to 5, the drying chamber B consists of an elongated drying chamber 15, preferably of rectangular cross section, and the sweating chamber A is of the same general cross section and aligned with the drying chamber, though somewhat shorter preferably. At the discharge end of the drying chamber 15, there is provided a means for generating a current of air, which may be a blower 17 having an intake 18 and communicating with the end of the drying chamber 15 through a suitable inlet conduit 19. The tubes which are to be dried are introduced first into the sweating chamber in which they are expanded for the purpose of loosening them from the mandrels upon which they have been formed. They then pass on to position between the sweating chamber A and the drying chamber B, where the mandrels are removed manually or otherwise from the tubes and, thereafter, the tubes enter the drying chamber, progressing in a direction toward the end at which the blower 17 is located and emerging in a dried state. The drier chamber B is, preferably, a long narrow heating compartment divided longitudinally into a main or central zone 20 which is approximately as wide as the tubes are long, and, in addition, two side zones 21, one at either side of the main zone. The main zone 20 constitutes the pathway of the tubes as they pass through the drier, and extends from top to bottom of the chamber. Within this main zone 20 are located a plurality of carriers D in superposed relation. In the practical embodiment employed, there are ten of these carriers placed one above the other to carry the tubes at ten levels within the drying chamber. The carriers D carry the tubes extending crosswise of the chamber, that is, transverse to the direction of their motion, partly to economize space and partly for convenience in introducing the tubes into the compartment.

In drying hollow articles, such as the tubes above described, great care should be exercised not to carry on the process too rapidly and also to dry all surfaces at approximately the same rate. If these conditions are not properly adjusted, the tubes will laminate or blister, producing a useless product. Therefore, in order to guide the air current so as to dry the tubes equally, inside as well as outside, means are provided to conduct the air current back and forth across the main zone from the side zones in a direction generally parallel to the length of the tubes. This means comprises a series of side partitions 23 preferably of a permanent or rigid nature which are fixed in the side zones 21 and extend to the edges of the main zone 20. Partitions 23 alternate with respect to the side zones in the direction of the length of the drying chamber. These partitions 23 are, in effect, continued across the main zone by flexible curtains 24 depending from suitable cross pieces 25 extending across the chamber. The curtains 24 are adapted to extend from the lower side of the carriers D downwardly, and are of sufficient length to lie against the tubes below. Thus, when the air enters the drying chamber B from the inlet 19, it is caused to follow a serpentine path back and forth across the main zone through and about the tubes to a side zone and then, reversing in direction, it recrosses the main zone to the other side zone, and so on to the end of the drier. In addition to the depending curtains 24 above described, there is provided means to prevent the air current from being shunted through the space between the upper and lower runs of the carriers D and which comprises a number of metal drums 26 inserted so as to prevent such action.

Located alongside the sweating chamber A and the drying chamber B, there is provided a conduit 27 which conducts the air from the end of the sweating chamber to an outlet 28. Additional impetus may be given to the emerging air by a blower, shown at 29.

The air introduced into the drying chamber is preferably heated, and for this purpose there is provided heating means comprising a system of steam heated coiled pipes 30 located at the intake 18.

As the air passes from one end of the drying chamber to the other end, it is, as above described, guided in its path in a horizontal direction. Due to the fact that the heated moist air will rise to the top of the chamber, there is provided means to mix the air of the various levels so as to equalize the temperature and humidity of the air at all levels within the compartment. This means comprises a number of auxiliary blowers 31 which withdraw the air from the upper levels of the drying chamber 15 through conduits 32 and introduce it again at a lower level through conduits 33. These auxiliary blowers 31 mix up the air at the different strata so that there is practically no difference in the characteristics of the air at any given vertical section of the drying chamber. The blowers 31 also serve to force the air forward assisting the main blower 17. At either end of the main zone there is provided a large number of curtains 24 to more completely block off the air from escaping through the ends of the conveyor. This provision retains the air within the conduit provided for its course.

In operation, the air current created by the fan 17 begins at the intake 18, proceeds downward and comes in contact with the heating coils 30 where its temperature is raised to the required degree. From this point it is drawn on into the fan 17 and thence is forced into the drying chamber through which it passes on its zig-zag journey through the whole length of the drier chamber and the sweating chamber. While passing through the drier chamber it encounters the tubes and operates to raise their temperature and evaporate their moisture, carrying the vapor away with it. On reaching the other end of the chamber A, it is drawn sidewise through the fan 29, thence into the conduit 27 to the outlet stack 28 at the farther end, from which it escapes into the air outside. This is the main movement of the air current as designed. Additionally, the auxiliary fans 31 tap the upper level of the air at various places along the length of the drier and draw the air from the upper level of one compartment and deliver it into the lower portion of another compartment a short distance further on in the direction of the air current of the drier thereby counteracting the tendency of the heated current to rise and remain in the upper parts of the drier. This stirring up of the air current also renders it possible to regulate the heat and to time the movement of the carriers D so as to get the same results for both the top and bottom stages.

In this connection it should be remembered that the carrier system of the drier 15 is divided into ten separate carriers, one over the other in ten separate tiers. The product of each stage passes directly through the drier on its own individual carrier from beginning to end. It thus becomes apparent that a close control should be maintained on the current of air to provide for an equal heating of each individual layer. The auxiliary fans 31 are merely one type of control.

Another and additional means for varying the temperature and humidity of the air along the length of the drying chamber and in the sweating chamber consists of a direct passageway leading over the floor under the lowermost conveyor from the right hand end (Fig. 3) of the drying chamber up to a point 200' at the forward end of the sweating chamber, and a series of valves or dampers 200 located in this chamber. When all of these dampers are open the air entering this passageway or by-pass is short-circuited directly up the entire length of the drying chamber and the sweating chamber. Where it is desired to secure a greater heat or less humidity in the sweating chamber, or at any point in the drying chamber, the damper at that point may be wholly or partially closed as the case may require, sending a fresh supply of drier and hotter air into the chamber above that damper. Such a control is very desirable under certain atmospheric conditions, it being thus possible to secure a proper distribution of heat and moisture so as to effect the requisite rate of drying in the drying chamber and the proper sweating in the sweating chamber.

The rate at which the moisture is taken up from the drying tubes depends upon the relative humidity of the air. As the rate at which the product is dried has a strong influence upon the quality of the finished tubes, an effective control is maintained over the humidity of the air as it enters the drier in the following manner: As shown in Fig. 4 the outlet stack 28 is connected with the inlet 18 by a by-pass 34. The proportions of the air from the inlet and the exhaust may be regulated in any suitable manner as, for instance, by means of shutter valves 35, 36, and 37, located in the conduit 34, the intake 18, and the exhaust stack 28, respectively. These shutter valves may, if desired, be automatically operated by means of expanding drums 38 operated by compressed air, the supply of which is regulated from the control device 39 which, in turn, is controlled by a humidity responsive device 40 located within the drying chamber. This humidity responsive device may consist of a material which expands and contracts in proportion to the moisture content of the air, and this device operates or controls the pressure regulator 39 in a manner similar to the temperature control hereafter described. The humidostat is made adjustable and may be set to operate at a predetermined degree of humidity.

In operation, if the outside air entering the drier is of the proper degree of humidity for securing the proper rate of drying of the product,—that is to say, that the degree of vapor saturation of the air entering the drier is such that a sufficient amount of moisture will be removed from the product during its travel through the drier to cause it to emerge therefrom in proper condition, and the rate at which the moisture is taken up is such that the moisture is not drawn from the surface of the product so rapidly as to cause an unequal drying with its resulting defects in the finished tube,—substantially all of the air drawn into the drier is taken from the region above the intake. If, however, owing to the atmospheric or other conditions, the air entering the drier from the outside atmosphere is entirely too dry the humidostat is adjusted so as to govern the condition. Being thus adjusted the expansion of the sensitive element within the humidostat operates through the pressure regulator to admit compressed air into the drums, thus causing a closing movement to take place of the dampers or valves in the inlet and outlet stacks and an opening movement of the valves within the by-pass 34. With such a combination of movements a certain amount of air will be deflected from the outlet stack through the by-pass to the inlet stack and as this air is laden with more or less moisture taken from the tubes in its former course through the drier, the mixture of air entering the chamber will have an increased humidity.

In order that the current of air entering the drier may be maintained at a predetermined temperature, certain control mechanisms therefor have been installed. These controls are shown in detail in Figs. 3 and 6. They comprise a temperature regulator 40', a recording thermometer 41, a condensation chamber 42, an exhaust steam diaphragm valve 43, and a live steam diaphragm valve 44. The live steam diaphragm valve 44 is located near the point where the steam enters the heating coils. The condensation chamber 42 and the exhaust steam diaphragm valve 43 are located beyond the point where the steam leaves the heating coils. The temperature regulator 40' and recording thermometer 41 may be situated nearby in any convenient location. In addition to the above, suitable thermometer bulbs are preferably employed, one located in the condensation chamber 42 and two in the air duct or conduit 19. One of the latter two thermometers is connected with the recording thermometer 41 and the other is connected with the temperature regulator 40', all of the thermometers above mentioned being of the vapor tension type and connected with their respective instruments by armored tubing. Thus, the thermometer bulbs 45 in the air duct are connected with the temperature regulator 40' and the recording thermometer 41 by armored tubing 46; and the thermometer bulb within the condensation chamber 42 is connected with the temperature regulator 40' by armored tubing 47. The temperature regulator 40' is provided with an arrangement of compressed air supply and a series of automatic devices within itself to regulate the air pressure within the diaphragm valves 43 and 44. By an automatic contrivance, the pressure of the air is so manipulated by the action of the vapor tension thermometers that the air pressure within each diaphragm valve 43 and 44 opens or closes the same in close conformity to the requirements to receive or release the steam through the valves to and from the coils 30. The regulator is under the control of the thermometers above described and is sensitive to the temperatures existing in the air duct 19 and the condensation chamber 42, and, being set to respond to a definite temperature range in either location, its influence upon the diaphragm valves is wholly automatic. Having determined the maximum temperature at which the air within the air duct should be maintained, an indicator, comprising a cam 48, is so set that when the thermometer 45 is influenced by the required temperature, the vapor tension created within the capsule 49 located within the instrument, operates to release the compressed air into the pipe 50 leading to the diaphragm 44 by means of a valve 51. The air pressure thus applied through the air supply pipe 52 to the valve 44 operates to close the live steam inlet to the heating coils 30 and thus checks a further increase of temperature therein. When the temperature of the air in the air duct 19 drops below the required temperature, the vapor tension within the capsule 49 of the regulator 40' is reduced and the air valve 51 closes and thereupon releases the pressure within the diaphragm valve 44 allowing the live steam valve to open and the steam to pass on again into the heating coils. The steam entering the heating coils 30 does not pass immediately through them but is retained within the coils in order that time may be allowed it to deliver its heat to the air which is in contact with the outside of the pipes of the coil. To retain the steam temporarily within the coils, the other diaphragm valve 43 is placed on the pipe leading from the heating coil. Between the heating coil and the exhaust steam valve 43 is interposed the condensation chamber 42 for the purpose of determining the temperature of the steam at that point. Located within this chamber is the vapor tension thermometer bulb 53, previously mentioned, which connects with the temperature regulator 40'. The thermometer bulb 53 is provided with a capsule 54 and an adjustable indicating cam 55 to operate a valve 56 in the compressed air line in a manner similar to that in which the valve 51 is operated. The valve 56 is adapted to control the air pressure supply to the exhaust steam valve 43 through a suitable tube 57. The latter valve is opened on a drop of temperature in the condensation chamber 42 to permit the steam to leave the coils 30.

To illustrate the action of this double temperature control, let a certain range in temperature be assumed as a requirement for the temperature of the air entering the drier 15. Let 160° be the maximum and 150° the minimum temperature. Starting with a temperature between 150° and 160° in the air duct 19, the valve 44 remains open permitting live steam to enter the coils 30 while the valve 43 remains closed holding the steam within the coils. As the temperature of the air rises in the air duct 19, its progress may be observed on a chart of the recording thermometer 41 and on reaching the maximum temperature, the valve 44 is automatically closed through the change of the thermometer 45 in the air duct 19 and the temperature regulator valve 51 which it controls. For a certain period the steam imprisoned within the coils 30 continues to give off heat to the surrounding air and to maintain the temperature within the air duct above the minimum. The release of the steam is not affected by the drop of temperature in the air duct 19 but takes place through the registration of the drop in temperature of the entrapped steam itself within the condensation chamber 42 which is provided for this purpose. By means of this direct registry, a more immediate action can be effected than by a registry upon the air in the duct. When the steam has fallen to a minimum degree, or to that degree which will result in a minimum degree in the air within the air duct 19, the thermometer 53 within the condensation chamber 42 operates to open the exhaust steam diaphragm 43, as above described, and to allow the entrapped steam to escape from the coils 30. Whenever the temperature of the air in the air duct 19 falls below 160°, for example, the valve 44 is opened admitting sufficient live steam to raise the temperature up to 160°, whereupon the valve 44 is automatically closed. Likewise, when the temperature of the steam within the condensation chamber 42 falls to the temperature of 150°, for example, the valve automatically opens, permitting the cooled portion of steam to escape making room for a hotter volume to move up to the exhaust. The temperature of the condensation chamber, therefore, rises and upon reaching the degree necessary to maintain a minimum temperature of air within the duct 19, the valve 43 automatically closes.

The arrangement of partitions within the sweating chamber A is substantially like their arrangement in the drier 15, for the reason that it is desired that the humid air entering follow a similar path. However, since the air is humid, very little drying effect is produced on the tubes passing through the sweating chamber, and for the most part they are merely heated as they pass therethrough. This heating action causes the desired expansion of the tubes on the mandrels, and as they emerge from the sweating chamber the mandrels are removed from the tubes either manually or by any desired contrivance, whereupon the tubes pass into the drier and are dried as above described. In order to assure that the air admitted into the sweating chamber 16 from the drier 15 is sufficiently hot to produce sweating, an additional heating system of steam pipes 60 is provided, the temperature of which is controlled by a temperature regulator system 61 of any desired type, more preferably of the character as described for controlling the temperature of the air entering the air duct 19.

As above mentioned, it is desirable that the tubes be exposed as nearly as possible equally on all parts of their surface to the action of the air current. The carriers D are, therefore, constructed so as to contact as little as possible with the surface of the tubes and, accordingly, the tubes are supported upon rollers 62 which are kept constantly rotating and transmitting their rotation to the tubes. Such rotation not only exposes all parts of the tube surfaces equally to the air current but also prevents the more or less plastic material of the wet tubes from being pressed out of shape by its own weight. These rollers 62 are supported on endless carrier chains 63 which, being part of carriers D, extend through the drier and sweating chambers. These rollers are kept rotating by a continuously moving chain 67 engaging a sprocket 66 on a gudgeon 65 at one end of each roller. Chain 67, which travels parallel to the carrier chain 63 keeps constantly in motion those rollers 62 which are on the upper side of the carriers. At either end of the path of the carriers the chains 67 pass over sprockets 68 and 69, the former of which is keyed to a shaft 70. A special drive is provided for the chains 67, the power being applied through the shaft 70 and the sprockets 68. The shafts 70 are associated in pairs by means of connecting chains 71 passing over sprockets 72, one such sprocket being keyed or otherwise fixed onto each shaft 70. For each pair thus associated, there is provided an electric motor 73 which transmits its power through suitable meshing pinions 74, 75, 76, 77, 78, and 79, in the order stated, pinion 79 being fixed on the shaft 70. The object of these pinions is to reduce the speed of the chains 67.

The roller gudgeons 65 are journaled in members 80 which are formed integrally with side plates of the chain links and have arms 81 extending in the direction of the chains 63. The arms 81 are adapted to engage with extensions 82 (Fig. 12) of the chain pins. The weight of the rollers is thus spread out over a number of links of the carrier chain and prevents the tendency of the roller supports to tilt in either direction.

Each of the chains 63 is adapted to pass over sprockets 83 and 83' at the respective ends of the drier, which points mark the beginning and ending of the path of the tubes in the drier. When in position suspended from the lower run of the chain 63, the rollers 62 are not rotated since the chain 67 is so spaced therefrom that it does not engage the sprockets 66. This avoids useless expenditure of power for turning the rollers 62.

In practical use the drier is of very great length and, therefore, the chains 63 are supported in a suitable manner to prevent sagging. In the embodiment illustrated, there are provided rails 210 upon which anti-friction rollers 210' carried by the chains ride when in their tube supporting position, and on their return each chain rests on a supporting channel 211.

The carrier chains 63 may be driven by a drive mechanism which applies force at only one end of the drier or, as in the embodiment illustrated here, the force may be applied at both ends. The latter is considered more desirable since one drive mechanism will drive the top runs of the carriers, and the other drive mechanism will drive the bottom runs, and the driving force will be distributed. All of these carriers are driven by entirely similar mechanisms and a description of one is illustrative of all. The drive at the charging end of the drier is shown in detail in Fig. 9, and the drive at the discharge end of the drier is shown in detail in Fig. 10. Referring first to the driving mechanism shown in Fig. 9, there is provided a rack 84 which is driven periodically to rotate a pinion 85 on a shaft 86 upon which the sprocket 83 is also mounted. It is seen that all the pinions 85 are engaged by the rack 84 and operate simultaneously upon the upward motion of the rack to move the carrier chains forward. In order to prevent the carrier chains from being moved in the reverse direction on the down stroke of the rack, each pinion 85 is provided with a ratchet wheel 87 which engages with a pawl 88. This reversing tendency in the chains 63 is also prevented by a brake which comprises a drum 89 rigidly fastened to the supporting framework of the driving mechanism, an internal drum 90 within, and a plurality of balls or rollers 91 which, upon any reversing tendency in the shaft 86 and the drum 90 which is keyed thereto, are adapted to be wedged between the cylindrical surface of the inner drum 90 and wedged shaped projections 92 on the internal surface of the drum 89.

The rack 84 is actuated alternately up and down by a pitman 93, which is connected at its upper end to a large gear 94 associated with the source of power. As the gear 94 rotates, therefore, it actuates the rack 84 to move the carrier chains 63 forward a distance equal to the center to center distance between the rollers 62, thereby advancing two more rollers to position to receive a tube.

Figure 8:
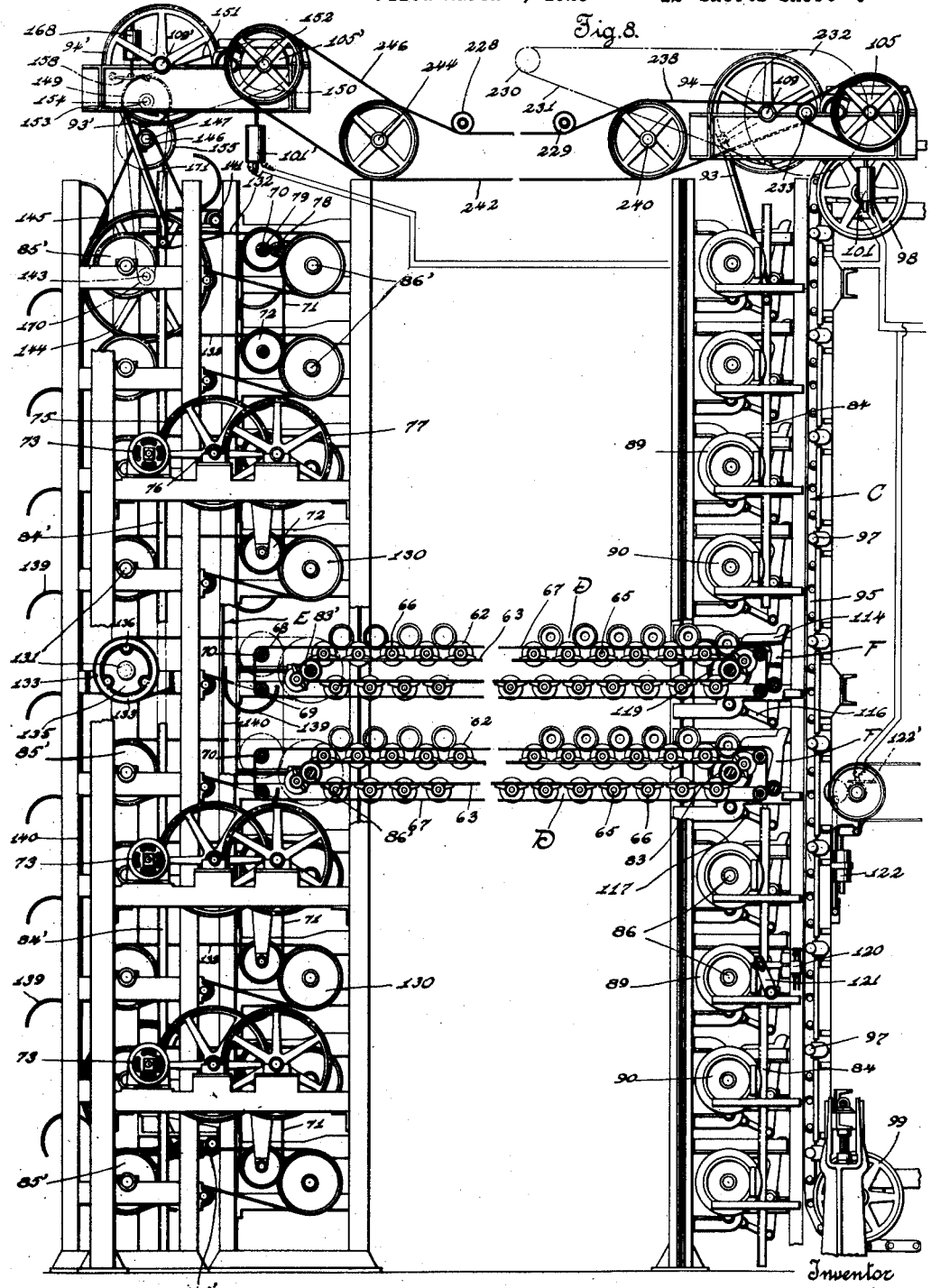
Fig. 8 is a detail view of the complete conveying mechanism of the drier, including the conveyors or carriers, the conveyor drive mechanism, the charging and the discharging means, the housing being omitted.

For the purpose of supplying tubes to the drier, as, for instance, from a tube forming machine, a transfer mechanism of suitable kind, such as is described in my said copending application, may be employed. As illustrated in that application, the transfer mechanism includes a conveyor comprising a pair of chains 95 and 96 provided with pairs of alined mandrel holding chucks 97 spaced at intervals equal to the distance between the drier carriers above described. The transfer conveyor moves upwardly past the supply point at which it receives the tubes one by one, from the tube forming machine, for instance, then horizontally at the top and then downwardly over a pulley 98 in front of the drier carriers and then about a pulley 99 back to the supply point. In Figs. 8 and 9, the discharge side of the conveyor, that is to say, the vertical run thereof in front of the drier, is illustrated. Each pair of chucks is adapted, as described in the above-mentioned application, to be automatically engaged with mandrels (upon which tubes have been formed) at the supply point and then the conveyor is moved ahead one step to bring another set of chucks into position to be engaged with the next mandrel delivered to the supply point. Assuming that such a number of tubes have been delivered to the transfer conveyor and the conveyor has been stepped ahead each time a tube is engaged therewith, that there are nine tubes on the discharge run of the conveyor, one tube in front of each of the first nine stages, when the next tube is engaged with the conveyor and the conveyor is moving ahead so as to bring a tube in front of each of the ten stages, suitable shifting arms F are moved back under the descending tubes where they have a period of rest. After the conveyor has completed its movements, the chucks 97 are automatically withdrawn so as to disengage the mandrels which are now resting on the shifting arms. The shifting arms are then thrown forward so as to deliver the tubes thereon to the respective carriers. The transfer conveyor continues its operation of picking up the mandrels one by one from the supply point until there are ten more tubes in front of the drier, when the series of operations just described are repeated.

The shifting arms F are provided at one end with suitably shaped portions 114 for receiving the ends of the mandrels. These arms F are fixed in pairs to the respective shafts 115 and each shaft has at one end an arm. Each arm is connected by means of a link 116 to a respective crank 117 carried by a pinion 118 engaging a spur gear 119 on the shaft 86.

In operation a switch (not shown) is provided which is operated once upon every ten steps forward of the transfer conveyor and this switch closes the circuit of a solenoid 101 controlling the rotation of the gear 94. As shown in Fig. 9, the solenoid 101 is provided with a bell crank 102 which normally supports or latches in position a bar 103. The purpose of this bar is to maintain a dog 104 out of engagement with a ratchet provided in a clutch 105. When the solenoid 101 is energized, as before described, it releases the bar 103, permitting the dog 104 to engage in the clutch 105 and thereupon power is transmitted through the reduction gearing 106, 107, to the gear 94 which is thereupon actuated to move the rack 84. The gear 94 then rotates counter-clockwise, somewhat less than 180°, until the crank pin 108 is positioned horizontally with respect to the shaft 109 upon which the gear 94 is journaled. At this position, the bar 103 is actuated by means of rollers 110 which strike against an extension 111 of the bar 103 to raise the dog 104, thereby releasing the clutch 105.

During this partial rotation of the gear 94, the rack is first lowered turning the pinions or gears 85 clockwise without actuating the carrier mechanism, and then the rack is raised during which time the drier carriers are moved forwardly a portion of a step and the arms F are thrown back into position beneath the now descending tubes carried by the transfer conveyor. The drive mechanism including the gear 94 now remains momentarily at rest until the descending tubes are brought into position on the arms and the chucks 97 are withdrawn. As the arms F move backwardly to this position, one of such arms carries back with it a switch 120 (Fig. 8) by means of an arm 121 keyed to one of the shafts 115 supporting the shifting arms 100. This switch 120 is positioned at one side of one of the transfer conveyor chains 95 and is actuated by contact with a chuck head 97 descending thereon. Switch 120 is adapted to close a circuit including a solenoid 122 which, as described in the above-mentioned application, operates to engage a clutch (not shown) which is located in the train of gears (not shown) operating the chuck releasing mechanism, (not shown). Thereupon, all the chucks on that portion of the chains 95 and 96 are released and held in such position, permitting the mandrels to drop into the receiving ends 114 of the arms F. When the chuck releasing mechanism is thus actuated, a suitable switch 122' associated therewith closes the circuit of the solenoid 101 whereupon clutch 105 is again engaged to rotate the gear 94 through the remaining portion of one revolution. As the gear is thus rotated, the rack is raised causing each of the drier carriers to complete its step motion, and also moving the shifting arms forwardly so that the tubes carried thereby will roll down the same onto the rollers of the drier carriers which are brought into receiving position when the arms have been moved to their forward delivering position. When the gear 94 has completed its revolution, the bar 111 is again engaged by one of the rollers 110 to disengage the clutch 105. Two rollers 110 are mounted upon each of a pair of small gears 112 which are in turn supported upon the shaft with gear 94. The gears 112 are actuated by a stationary pinion 113 so that upon rotation of the gear 94 the gears 112 also rotate giving the rollers 110 a planetary motion of their own. There are two such sets of rollers 110 with similar actuating mechanism, and they are placed somewhat less than 180° apart. As they pass by the extension 111 of the bar 103 they are adapted to strike thereagainst to stop the motion of the gear 94 by disengaging the clutch 105. Subsequently, upon energization of the solenoid 101, the clutch 105 is again engaged causing the gear 94 to rotate and return the pitman to its position as shown in Fig. 9.

As has been above described, there are two rollers 110 on each gear 112. The purpose of having two rollers 110 is to provide a means for varying the distance the carriers are advanced. The gear ratio between the gear 112 and the pinion 113 is such that these rollers 110 will alternately contact against the extension 111 of the bar 103 so that if one of the rollers 110 be removed from each gear 112, the remaining rollers 110 will strike against the extension 111 only upon the alternate revolutions of the gear 94. In such case the rack 84 is reciprocated without intermission twice instead of once, as before described, and the conveyor is moved forward two steps. As a general proposition, this is desirable in case the tubes delivered to the conveyor are of a diameter greater than the center to center distance between the rollers 62.

At the discharging end of the drier the driving mechanism is substantially the same as at the charging end described, except that the shaft 86' carries a sprocket 130 which is associated with the main driving shaft 131 by means of a chain 132, and a sprocket 133 on the shaft 131. Shaft 131 is driven in precisely the same manner as the shaft 86, there being provided a rack 84', pinion 85', and the brake previously described. The sprocket 133 is so constructed that its periphery may be rotated with respect to the shaft 131, there being provided a dog 134 carried by an internal section 135 rigidly attached to the shaft 131, and teeth on the internal edge of the outer section of the sprocket for engagement with the dog 134. In the internal section 135 there are provided circular apertures 136 into which may be inserted a round tool (not shown) with teeth to engage the teeth on the internal surface of the exterior portion of the sprocket. When this tool is inserted into the aperture 136 and rotated in a counterclockwise direction, the exterior portion of the sprocket is rotated with respect to the inner section 135 to take up the slack in the chain 132. This arrangement provides means for angularly adjusting the sprocket 83' relative to the sprocket 83 so that the teeth of both of these sprockets will properly mesh with the chains 63 and each will assume its proportionate share of its driving duty. Thus the driving force applied to the chains 63 is equally distributed to the driving mechanisms at the opposite ends of the drier.

Slack in the carrier chains 63, due to wear or stretching, may be taken up by means of a bolt 137 provided with a nut 138 and attached at the other end to the bearing of the shaft 86' (Fig. 10). By tightening or loosening the nut 138 the bearing may be moved forward and backward to tighten or loosen the chain, as desired.

The power to operate the gears 94 and 94', which through the pitmen 93 and 93' reciprocate the racks 84 and 84', is supplied from a pulley 230 through a chain or belt 231 to a sprocket or pulley 232 mounted on the shaft 233. There are two sprockets 234 and 235 provided on shaft 233. Sprocket 234 is connected by a chain 236 to a sprocket 237 mounted on the same shaft as the clutch 105. The other sprocket 235 is connected by means of a chain 238 to a sprocket 239 on shaft 240. Another sprocket 241 of the same size as sprocket 239 is mounted on shaft 240 and is associated by means of a chain 242 with a sprocket 243 of equal size mounted on a shaft 244 at the discharge end of the drier. A second sprocket 245 on shaft 244 connects by means of a chain 246 with a sprocket 247 mounted on the shaft with the clutch 105'. Thus the power from the pulley 230 is transmitted equally to the clutches 105 and 105' and thereby to operate the pitmen 93 and 93'. There are provided suitable adjustable idler sprockets 228 and 229, by means of which slackness in the chain 242 may be taken up and adjusted.

The chain 242 is necessarily of great length since it extends from end to end of the drier chamber and, therefore, that portion of the chain which is under tension is kept immersed in a bath of oil contained in a trough 248 (Fig. 16), to reduce friction and wear in the pins and bearings of the chain. There is also provided in the trough 248 a guide comprising a pair of vertically spaced blocks 249 and 250, block 250 being supported on the floor of the trough and block 249, which is the upper of the two, being bolted to a supporting member 251. The chain 242 which is preferably of the roller type, is held between members 249 and 250 by its side plates, while the rollers roll with practically no friction between the guides. The weight of the trough 248 and the parts therewithin is borne by suitable structural members such as an I-beam 252. The upper side of chain 242 is supported by idler sprockets 253 spaced at suitable intervals.

There is thus provided a complete physical connection between the two drive mechanisms at the opposite ends of the drier and therefore neither mechanism can advance over the other and produce an undue burden on the other mechanism. This arrangement also insures a complete synchronism of the whole system. The solenoids 101 and 101' which control the clutches 105 and 105' to rotate the gears 94 and 94' respectively, are accordingly controlled by the same electrical circuit. Therefore they operate simultaneously and start and stop the drive at substantially the same instant.

When a tube has reached a position between the last two rollers on the upper side of a carrier D, the next step forward of the carrier will drop the tube into a discharge conveyor E having curved arms 139, one pair of such arms being normally positioned before each carrier (Fig. 10). The ten tubes delivered from their respective carriers are thus dropped into these receiving arms 139 simultaneously and, at the same time, a mechanism is set in motion to lower these arms, delivering the tubes carried thereby into a suitable receptacle (not shown) below. The arms 139 are mounted on chains 140 which pass over guiding sprockets 141 above and similar sprockets 141' below. The chains 140 also pass over large sprockets 142 by which the receiving arms 139 are moved in a continuous path into receiving position before the carriers and inverted as they are brought back on the opposite side. The sprockets 142 (Fig. 11) are mounted on a shaft 143 which is also provided with another sprocket 144 connected by a chain 145 with a sprocket 146 mounted on a shaft 147. The power to drive this discharging conveyor E is provided by the same source which drives the crank gear 94' and is applied through a clutch connected with the power driven shaft 152 through suitable sprockets 149 and 150, and a chain 151. A pinion 153 is loosely journaled on the shaft 154 upon which the sprocket 149 and the fixed portion 148 of the clutch are mounted. This pinion, with the clutch engaged, is adapted to drive the gear 155 and the sprocket 146 rotatable therewith, and in consequence the main driving sprocket 142 for the discharging conveyor chain 140. The clutch for this mechanism is shown in detail in Fig. 14 and comprises the portion 148 fixed to the shaft 154, a disk 156 integral with the pinion 153 and normally rotatable on the shaft 154, and a controlling disk 157 which is adapted to hold the clutch engaged for the interval of time required for the chains 140 to be stepped forward a distance sufficient to discharge all of the receiving arms 139. The clutch (Fig. 14) is controlled by a pivoted forked member 158 having forwardly extending arms 159 and 160. Engagement between the fixed portion 148 and the disk 156 is made by a dog 161 which is adapted to move in a direction radial of the disk 156, in a slot 162 in the disk. The dog is substantially rectangular in cross section and extends inwardly and under the fixed portion 148 so that upon its movement radially outward it may slide into position in rectangular notches 163 provided in the edge of the fixed member 148 adjacent the disk 156. It will be seen that upon the insertion of the dog 161 in any one of the notches 163, the two members 148 and 156 are keyed together and, in such case, the power from the shaft 154 is transmitted to the receiver arm carrying chains 140 through the gearing and chains above described. The radial movement of the dog 161 is controlled by a bell crank which has a short arm 164 engaging the dog 161 in a notch 165 thereof; and a relatively long arm 166 which extends slightly beyond the periphery of the disk 156 so as to be engageable by the arm 159. A sector of the disk 156 is cut away at 167 to provide room for the rotation of the bell crank, and, more particularly, its arm 166. Beneath the dog 161 there is mounted a spiral spring (not shown) which normally presses the dog upwardly. Thus, when released the arm 166 of the bell crank tends to move to position against the edge of the sector 167.

A solenoid 168 is provided to lift the pivoted member 158 so that its arm 159 disengages from the arm 166 permitting the clutch to take hold and transmit the desired power. The solenoid 168 is operated upon the closing of its circuit by a switch controlled by the rotation of the gear 94'. This switch, which is shown in detail in Fig. 17, comprises a commutator 260 having three electrically conductive bars 261 spaced from each other by the body of the commutator which is preferably of a hard insulating material. The commutator 260 is rotationally mounted on a bracket 262 and is rotated by means of a star wheel 263 having six arms, each alternate arm corresponding to a segment 261. Two bars 264 are pivotally mounted on the bracket 262 and are pressed against the commutator 260 by means of coil springs 265. Each of these bars has a contact 266 with a lug 267 thereon for attachment with an electrical conductor. The electrical circuit of the solenoid 168 is therefore closed whenever the commutator bars 261 contact with the contacts 266. At all other times this circuit is open. This closure is accomplished by a pin 268 on the edge of gear 94' which turns the star wheel 263 in passing. The circuit is again opened by further rotation of the star wheel turned by a second pin 269 on the gear 94'. Thus the solenoid 168 remains energized for a short period of time allowing the mechanism time to get under way before leaving it entirely to its own automatic stop device. This energization of the solenoid is only momentary and therefore additional means is provided to keep the pivoted member 158 elevated so that upon rotation of the disk 156 the arm 166 will not be tripped by the arm 159 until all ten of the receiver arms 139 have deposited their tubes, as above described. This means for maintaining the pivoted member 158 in elevated position includes the disk 157 and the arm 160.

On the shaft 143 which supports the sprocket 142, there is fixed a smaller sprocket 170 which is connected by a chain 171 with a sprocket 172 loosely journaled on the shaft 154. The sprocket 172 is formed integrally with the disk 157. It will be seen, therefore, that upon movement of the arms 139 with the chains 140, the disk 157 is rotated by means of the sprockets 172 and 170 in such a manner that the bent arm 160 is held up to keep the clutch disengaged. Re-engagement of the clutch cannot take place until the disk 157 has rotated a complete turn to permit the arm 160 to fall into the notch 163 whereupon the arm 159 can again engage the arm 166 to release the clutch mechanism. The rotation of the disk 157 is accordingly timed by proportioning the sprockets 172 and 170 so that there is one revolution of the disk 157 upon ten steps forward of the arms 139.

The operation of the drive mechanism is as follows: When the transfer conveyor chains 95 and 96 have advanced nine and a fraction steps so that a tube carried by one of the chucks is approaching a position in front of the lowermost carrier D, the solenoids 101 and 101' located at the opposite ends, respectively, of the drier, operate and engage the clutches 105 and 105' to start the gears 94 and 94' to rotate. Thereupon, by means of the pitmen 93 and 93', the racks 84 and 84' are reciprocated and upon the upstroke the pinions 85 are rotated thereby in a counterclockwise direction. By means of the connecting rods or links 116 the shifting arms F are caused to tilt backwardly under the approaching tubes. This causes the receiving ends 114 of the shifting arms F to assume the position shown in dotted lines, Fig. 9, beneath the tubes. The chains 63 are simultaneously advanced carrying the rollers 62 forward slightly. The gear 94 stops with the crank pin at a substantially horizontal position as one of the small rollers 110 engages the extension 111 of the bar 103 thereby disengaging the dog 104 of the clutch 105. Meanwhile, the chains 95 and 96 of the transfer mechanism are advanced so that the tubes now rest within the receiving ends 114 of the shifting arms F, at which point the entire mechanism stops momentarily. Also, the switch 120 has moved forward with the shifting arms F so that the head of one of the chucks 97 rests thereon closing the switch contacts to complete the circuit of the solenoid 122 which operates to close the clutch connecting a suitable source of power with the chuck disengaging mechanism. With the tubes thus disengaged the solenoids 101 and 101' again operate engaging the clutches 105 and again starting the rotation of the gears 94 and 94' whereupon the racks 84 and 84' cause the chains 63 to advance the rollers 62 to position to receive tubes therebetween, and additionally the shifting arms F are caused to move forward until they tilt slightly whereupon the tubes roll from the receiving ends 114 into position between the rollers 62. At the discharge end of the drier the circuit of the solenoid 168 has, meanwhile, been completed, raising the forked member 158 and engaging the clutch associated therewith. Power is then transmitted to the pinion 153 through this clutch to rotate the gear or sprocket 144 causing the chains 140 to carry downwardly the tubes discharged into the curved arms 139, depositing them either on the floor or in a suitable receptacle.

Thus, by the above construction, are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language might be said to fall therebetween.

What I claim is:—

1. A drier having a chamber, means for moving articles to be dried therethrough and continuously rotating said articles, and means for directing a current of air successively back and forth across said chamber to dry the articles moving therethrough.

2. A drier having a chamber, means for intermittently moving articles to be dried therethrough and continuously rotating said articles, and means for directing a current of air successively back and forth across said chamber to dry the articles moving therethrough.

3. In an apparatus of the character described, in combination, means for moving a plurality of tubes in a direction transverse of their length, means for rotating said tubes while moving through the drier, means for directing an air current through and about certain of the tubes in the direction of their length, and means for redirecting the same air current through other of the tubes, comprising baffles forming a serpentine passage along the length of said moving means.

4. In an apparatus of the character described, in combination, a carrier supporting tubes side by side transverse to the direction of motion, and means for directing an air current back and forth through and about successive tubes, and means for mixing the air of one level with that of another level.

5. In an apparatus of the character described, a drying chamber divided longitudinally into a main zone for the accommodation of articles to be dried and two side zones, means for moving the articles through said main zone, means to generate an air current, means to conduct the air current back and forth across the main zone from the side zones in a serpentine path from one end of the chamber to the other end, and means for changing the position of the articles on said moving means to thereby present all surfaces of the articles to be dried to the air current.

6. In an apparatus of the character described, a drying chamber divided longitudinally into a main zone for the accommodation of articles to be dried and two side zones, means to generate an air current within the chamber, means to conduct the air current back and forth across the main zone from the side zones, a carrier including rollers in said main zone, means for intermittently moving said carrier, and means for continuously rotating said rollers.

7. In an apparatus of the character described, a drying chamber, means therein for conveying articles therethrough, means for generating an air current within said chamber, and means for mixing the air of the different levels within the chamber between its ends whereby to equalize the temperature and humidity of the air at all levels.

8. In an apparatus of the character described, a drying chamber, means for moving articles therethrough to be dried, means to generate an air current within said chamber, and means between the ends of the chamber to equalize the temperature of the air at all levels.

9. In an apparatus of the character described, a drying chamber, means for moving articles therethrough to be dried, means for conducting the air current back and forth across the path of movement of the articles, and means to equalize the temperature of the air at all levels within the chamber.

10. In an apparatus of the character described, a drying chamber divided longitudinally into a main zone and two side zones, means to generate an air current, and means to conduct the air current back and forth across the main zone from the side zones, and means intermediate the ends of said chamber to equalize the temperature of the air at all levels within the chamber and force the air forwardly.

11. In an apparatus of the character described, a drying chamber, means for moving articles to be dried therethrough, means to generate an air current, means to conduct the air current back and forth across the path of movement of said articles in a serpentine path from one end of the chamber to the other end, a by-pass leading from an upper level forwardly to a lower level within said chamber, and means for causing air to flow through said by-pass.

12. In an apparatus of the character described, a drying chamber divided longitudinally into a main zone for the accommodation of articles to be dried, and two side zones, means to generate an air current, means to conduct the air current back and forth across the main zone from the side zones in a serpentine path from one end of the chamber to the other end, means for mixing the air so that the temperature and humidity thereof is substantially uniform at all levels within the chamber, and means to advance the articles to be dried longitudinally of the chamber whereby such articles are subjected to increasingly dry air.

13. In a device of the character described, a drying chamber divided longitudinally into a main zone for the accommodation of articles to be dried and two side zones, means to generate an air current, means to conduct the air current back and forth across the main zone from the side zones in a serpentine path from one end of the chamber to the other end, means to equalize the temperature of the air at all levels within the chamber, and means to present all surfaces of the articles to be dried to the air current.

14. In an apparatus of the character described, a drying chamber divided longitudinally into a main zone for the accommodation of articles to be dried and two side zones, means to generate an air current, a plurality of transverse partitions, each extending across the main zone and one of the side zones to conduct the air current back and forth across the main zone, said partitions including flexible curtains cooperating with the articles to be dried, and walls within the side zones to form a serpentine path for the air current from one end of the drying chamber to the other end, and means for mixing the air of different levels within said chamber 15. In an apparatus of the character described, a sweating chamber, a drying chamber, means for moving articles to be dried successively through said chambers, and means for conducting a current of air through the drying chamber to dry the articles and then through the sweating chamber to facilitate removal of the articles from the members on which they are formed 16. In an apparatus of the character described, a sweating chamber, a drying chamber, means for moving articles to be dried successively through said chambers, a space between said chambers at which the members on which the articles are formed are withdrawn, and means for passing a current of air first through the drying chamber and then through the sweating chamber.

17. In an apparatus of the character described, a sweating chamber, a drying chamber, and a space therebetween at which the members on which the articles are formed are withdrawn, means for moving the articles to be dried through the sweating chamber, said space and drying chamber in succession, a conduit leading about said space from the drying chamber to the sweating chamber, and means for passing a current of air through the drying chamber, said conduit and sweating chamber, in succession.

18. In an apparatus of the character described, a sweating chamber, a drying chamber, and a space therebetween, a carrier passing successively through said sweating chamber, said space, and drying chamber, means for passing a current of air through said drying chamber and then through said sweating chamber, and means in the sweating chamber and drying chamber adjacent said space for preventing the drying medium from flowing into said space 19. In an apparatus of the character described, a sweating chamber, a drying chamber, means for moving articles to be dried successively therethrough, and means for causing a current of air to pass back and forth across the path of movement of the articles within both of said chambers.

20. In an apparatus of the character described, a sweating chamber and a drying chamber, means for moving articles to be dried successively through said chambers, and partitions within said chambers arranged in staggered relation in opposite sides thereof to cause the current of air to flow back and forth in a serpentine path across the path of movement of the articles.

21. In an apparatus of the character described, a sweating chamber, a drying chamber, means for moving articles to be dried successively therethrough, means for passing a current of air through the drying chamber and then through the sweating chamber, and means associated with the sweating chamber for controlling the temperature of the air therein 22. In an apparatus of the character described, a sweating chamber, a drying chamber, means for moving articles to be dried successively therethrough, means for passing a current of air through the drying chamber and then through the sweating chamber, and automatically operated means associated with the sweating chamber for controlling the temperature of the air therein 23. In an apparatus of the character described, a sweating chamber, a drying chamber, means for moving articles to be dried successively therethrough, means for passing a current of air through the drying chamber and then the sweating chamber, means for controlling the temperature of the air as it passes into the drying chamber, and means for controlling the temperature of the air passing into the sweating chamber 24. In an apparatus of the character described, a sweating chamber, a drying chamber, means for moving the articles to be dried successively through said chambers, means for passing a current of air about the articles in the drying chamber and then in the sweating chamber, and means for supplying an auxiliary supply of air to the sweating chamber to regulate the humidity of the medium admitted thereto.

25. In an apparatus of the character described, a sweating chamber, a drying chamber, means for moving articles to be dried successively through said chambers, means at the forward end of said drying chamber for heating the air admitted to said drying chamber, means for passing the air so heated about the articles in the drying chamber and then the sweating chamber, and means for by-passing the air from said heating means to said sweating chamber without passing over said articles for regulating the humidity of the air admitted to said sweating chamber.

26. In an apparatus of the character described, a sweating chamber, a drying chamber, means for moving articles to be dried successively through said chambers, means for passing a current of air about said tubes in the drying chamber and then in the sweating chamber, means associated with the sweating chamber for controlling the temperature of the air admitted thereto, and means for controlling the humidity of the air admitted to the sweating chamber.

27. In an apparatus of the character described, a sweating chamber, a drying chamber, means for moving articles to be dried successively through said chambers, means for passing a current of air about the articles in the drying chamber and then in the sweating chamber, means for controlling the temperature of the air admitted to the drying chamber, means for controlling the humidity of the air admitted to the drying chamber, means for changing the temperature of the air admitted to the sweating chamber, and means for changing the humidity of the air admitted to the sweating chamber.

28. In an apparatus of the character described, a sweating chamber, a drying chamber, means for moving the articles to be dried successively through said chambers, means for passing a current of air about the articles to be dried in the sweating chamber and then in the drying chamber, means for heating the air admitted to the drying chamber, automatic means for controlling said heating means, automatic means for controlling the humidity of the air admitted to the drying chamber, means at the entrance of the sweating chamber for supplying additional heat to the air, means for controlling said last heating means, and means for supplying auxiliary air to the sweating chamber to control the humidity of the air admitted thereto.

29. In a device of the character described, a drying chamber, means to generate a current of heated air through said drying chamber, and a second chamber into which the articles to be dried are initially introduced on mandrels, means for moving articles to be dried through said chamber, and a connecting conduit between the two said chambers to convey the warm, humid air from the drying chamber to the second chamber whereby such articles are expanded and loosened from the mandrels.

30. In an apparatus of the character described, a drying chamber, means to generate a current of heated air through said drying chamber, and a second chamber into which the articles to be dried are initially introduced on mandrels, a connecting conduit between the two chambers to convey the warm humid air from the drying chamber to the second chamber, and means to increase the heat of the humid air before it is introduced into the second chamber whereby such articles are expanded and loosened from the mandrels.

31. In an apparatus of the character described, a sweating chamber, a drying chamber, means for moving articles to be dried successively through said chambers, means for conducting a current of air about the articles within the drying chamber and then in the sweating chamber, and means for regulating the temperature and humidity of the air along the length of the drying chamber and in the sweating chamber.

32. In an apparatus of the character described, a drying chamber divided longitudinally into a main zone for the accommodation of articles to be dried and two side zones, means to generate an air current, means to conduct the air current in a serpentine path from one end of the chamber to the other end, and means to vary the temperature and humidity of the air current along the length of the drying chamber including a by-pass and valves therein.

33. In an apparatus of the character described, a drying chamber, means for moving articles therethrough, means for passing a current of air over the articles within the drying chamber, means for regulating the temperature and humidity of the air along the length of the drying chamber, and means for mixing the air of the several levels within the drying chamber to equalize the temperature and humidity thereof.

34. In an apparatus of the character described, a drying chamber, means for moving articles to be dried therethrough, means for passing a current of air about the articles within the chamber, means for controlling the humidity and temperature of the air admitted to said chamber, and means for by-passing a portion of the regulated air admitted to the drying chamber to any one of a predetermined number of points along the length of the drying chamber.

35. In an apparatus of the character described, a drying chamber, means for passing articles to be dried therethrough, means for passing a current of air through said chamber, means for heating the air admitted to the chamber, automatic means for controlling said heating means, and means for regulating the humidity of the air admitted to the chamber and including means for mixing predetermined proportions of atmospheric air and air which has already passed through the chamber.

36. In an apparatus of the character described, a drying chamber, means for passing articles to be dried therethrough, means for passing a current of air through said chamber, means for heating the air admitted to the chamber, automatic means for controlling said heating means, means for regulating the humidity of the air admitted to the chamber and including means for mixing predetermined proportions of atmospheric air and air which has already passed through the chamber, means for by-passing air to any one of predetermined points along the length of the chamber, and means for mixing the air of the several levels within the chamber.

37. In an apparatus of the character described, a chamber, a plurality of superposed carriers therein supporting tubes side by side transverse to the direction of motion, means for directing a continuous air current successively through and about the tubes of each carrier, and means for rotating said tubes.

38. In an apparatus of the character described, a chamber, a plurality of superposed carriers therein, means for directing a current of air through said chamber, and means for controlling said air for maintaining the temperature and humidity thereof substantially uniform at the several stages.

39. In an apparatus of the character described, a chamber, a plurality of superposed carriers therein supporting tubes side by side transverse to the direction of motion, means for directing an air current back and forth across said chamber, and means for counteracting the tendency of the heated current to rise and remain in the upper stages.

40. In an apparatus of the character described, a chamber, a plurality of superposed carriers therein supporting tubes side by side transverse to the direction of motion, means for directing an air current back and forth through and about successive tubes on the several carriers, and means for mixing the air of one level with that of another level.

41. In an apparatus of the character described, a drying chamber having a plurality of stages each including a carrier, said chamber having transverse partitions alternately arranged to provide a serpentine air passage for conducting the air back and forth across said carriers.

42. In an apparatus of the character described, a drying chamber, a plurality of superposed carriers therein, and a plurality of partitions extending across the path of movement of said carriers, alternate partitions being open at one end, and intervening partitions at the opposite end whereby to provide a serpentine air passage in said chamber, each of said partitions including means cooperating with said carriers for preventing the air from passing directly longitudinally through the chamber.

43. In an apparatus of the character described, a drying chamber divided longitudinally into a main zone and two side zones, a plurality of superposed carriers within the main zone, means to generate an air current, a plurality of transverse partitions extending across the main zone and one of the side zones to conduct the air back and forth across the main zone, said partitions including walls within the side zones, and flexible curtains forming projections of said walls and positioned between said carriers.

44. In an apparatus of the character described, a drying chamber, a plurality of superposed carriers each having upper and lower runs, and means within the chamber forming a serpentine path for an air current, said means including curtains between the carriers for preventing the air from passing directly longitudinally of the carriers.

45. In an apparatus of the character described, a drying chamber, a plurality of superposed carriers therein, each having an upper and a lower run, and means within the chamber for forming a serpentine passage for an air current, said means including flexible curtains between the carriers, and means between the runs of the several carriers for preventing the air from passing directly longitudinally of the chamber.

46. That method of drying articles which consists in moving the same through a drying chamber, passing a current of air through the chamber in a direction generally opposite to the direction of movement of the articles, and mixing the air of the several levels between the ends of the chamber whereby to maintain the humidity and temperature substantially uniform at all levels.

47. That method of drying articles which consists in moving the articles through a drying chamber, passing a current of air through the chamber in a direction generally opposite to the direction of movement of the articles and by-passing the air from an upper level of the chamber forwardly to a lower level.

48. That method of drying articles which consists in moving the articles through a chamber in a predetermined path, causing a current of air to flow repeatedly back and forth across the path of movement of the articles, and mixing the air of the several levels of the chamber so as to maintain the humidity and temperature of the air of all of the levels substantially uniform.

49. The herein described method of drying tubes which consists in moving a plurality of tubes side by side in a direction transverse to their length, directing an air current through and about the successive tubes in the direction of their length, and mixing the air within the chamber to maintain uniform humidity and temperature at all levels.

50. The herein described method of drying articles which consists in moving the articles in a predetermined path, drying said articles by passing a relatively drier air of higher temperature over the articles in a direction generally opposite to their direction of travel until the air is moisture laden, and then passing the moisture laden air over the articles to sweat them from the members on which they are formed.

51. The herein described method of drying tubes formed on mandrels which consists in moving the tubes in a predetermined path, passing a current of drying air over the tubes after the mandrels are withdrawn therefrom, and passing the moisture laden air employed for drying the tubes over the tubes before the mandrels are withdrawn therefrom in order to expand the tubes to permit withdrawal of the mandrels.

52. The herein described method of drying tubes formed on mandrels which consists in moving the tubes in a predetermined path, passing a current of drying air back and forth across the path of movement of the tubes and in the direction of their length after the mandrels have been withdrawn from the tubes, and then passing the moisture laden air employed for drying purposes over the tubes with the mandrels therein in order to expand the tubes and thereby permit removal of the mandrels.

53. The herein described method of drying tubes formed on mandrels which consists in moving the tubes side by side in a direction transverse to their length, directing a current of air back and forth across the path of movement of the tubes in the direction of their length to dry the tubes, and then passing the air back and forth across the tubes with the mandrels therein in the direction of the length of the tubes to expand the tubes and thereby permit withdrawal of the mandrels.

54. The herein described method of drying articles which consists in moving the articles in a predetermined path, drying said articles by passing a relatively drier air of higher temperature over the articles in a direction generally opposite to their direction of travel until the air is moisture laden, then passing the moisture laden air over the articles to sweat them from the members on which they are formed, and automatically regulating the temperature and humidity of the air.

55. The herein described method of drying articles which consists in moving the articles in a predetermined path, drying said articles by passing a relatively drier air of higher temperature over the articles in a direction generally opposite to their direction of travel until the air is moisture laden, then passing the moisture laden air over the articles to sweat them from the members on which they are formed, automatically controlling the temperature and humidity of the air as it is introduced for drying purposes, and regulating the temperature of the air after it has dried the tubes and before it has sweated the same.

56. The herein described method of drying articles which consists in moving the articles in a predetermined path, drying said articles by passing a relatively drier air of higher temperature over the articles in a direction generally opposite to their direction of travel until the air is moisture laden, then passing the moisture laden air over the articles to sweat them from the members on which they are formed, controlling the temperature and humidity of the air admitted for drying purposes, and controlling the temperature and humidity of the air after it has dried the tubes for sweating purposes.

57. The herein described method of drying articles which consists in moving the articles in a predetermined path, drying said articles by passing a relatively drier air of higher temperature over the articles in a direction generally opposite to their direction of travel until the air is moisture laden, then passing the moisture laden air over the articles to sweat them from the members on which they are formed, and then controlling the humidity of the air after it has dried the tubes.

58. The herein described method of drying articles which consists in moving the articles in a predetermined path, drying said articles by passing a relatively drier air of higher temperature over the articles in a direction generally opposite to their direction of travel until the air is moisture laden, then passing the moisture laden air over the articles to sweat them from the members on which they are formed, and adding additional air to the current after it has dried the tubes for controlling the humidity of the current which sweats the tubes.

59. The herein described method of drying tubes formed on mandrels which consists in moving the tubes in a predetermined path, passing a current of drying air over the tubes after the mandrels are withdrawn therefrom, passing the moisture laden air employed for drying the tubes over the tubes before the mandrels are withdrawn therefrom in order to expand the tubes to permit withdrawal of the mandrels, and increasing the temperature of the air current after it has dried the tubes so as to properly sweat the tubes.

60. The herein described method of drying articles which consists in moving the articles through a sweating chamber and then a drying chamber, passing a current of air through the drying chamber and then the sweating chamber, and regulating the temperature and humidity of the air along the length of the drying chamber and the sweating chamber.

61. The herein described method of drying articles which consists in moving the articles through a drying chamber, passing a current of air through the chamber in a direction generally opposite to the travel of the articles, and controlling the temperature and humidity of the air along the length of the chamber by admitting auxiliary air at the desired point.

HOWARD PARKER.